(12) United States Patent
Hemphill et al.

(10) Patent No.: US 10,989,191 B2
(45) Date of Patent: Apr. 27, 2021

(54) INTEGRATED MOTOR AND PUMP INCLUDING RADIALLY MOVABLE OUTER GERATOR

(71) Applicant: Schaeffler Technologies AG & Co. KG, Herzogenaurach (DE)

(72) Inventors: Jeffrey Hemphill, Copley, OH (US); Justin Bitar, Waxhaw, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 344 days.

(21) Appl. No.: 15/938,042

(22) Filed: Mar. 28, 2018

(65) Prior Publication Data
US 2019/0301456 A1  Oct. 3, 2019

(51) Int. Cl.
  *F04C 15/06* (2006.01)
  *F04C 2/10* (2006.01)
  *F04C 15/00* (2006.01)

(52) U.S. Cl.
  CPC ............... *F04C 15/06* (2013.01); *F04C 2/10* (2013.01); *F04C 15/008* (2013.01)

(58) Field of Classification Search
  CPC .. F04C 2/10; F04C 2/103; F04C 2/104; F04C 2/105; F04C 18/10; F04C 18/22; F04C 18/24; F04C 18/26; F04C 15/06; F04C 15/008
  See application file for complete search history.

(56) References Cited

U.S. PATENT DOCUMENTS

| | | | |
|---|---|---|---|
| 4,439,119 A * | 3/1984 | Petersen | F04C 2/103 418/186 |
| 5,380,169 A | 1/1995 | Eisenmann | |
| 6,109,887 A | 8/2000 | Takura et al. | |
| 2006/0039815 A1 | 2/2006 | Chertok et al. | |
| 2006/0140810 A1* | 6/2006 | Kameya | F04C 15/0034 418/61.3 |
| 2014/0119963 A1 | 5/2014 | Hadar et al. | |

(Continued)

FOREIGN PATENT DOCUMENTS

| CN | 107461333 A | 12/2017 |
| JP | 05302576 A | 11/1993 |
| KR | 101573662 B1 | 12/2015 |

OTHER PUBLICATIONS

International Search Report and Written Opinion for corresponding PCT application.

*Primary Examiner* — Bryan M Lettman
(74) *Attorney, Agent, or Firm* — Davidson, Davidson & Kappel, LLC (57) ABSTRACT

A pump includes a fluid inlet section, a fluid outlet section, a rotor axially between the fluid inlet section and the fluid outlet section, a stator surrounding the rotor and a center section radially inside of the rotor on a center axis of the pump. The rotor and the center section define a fluid flow chamber radially therebetween. The rotor is rotatable inside of the stator about the center section by electromagnetic forces urging the rotor towards the stator. The pump also includes an inlet control section configured for regulating fluid flow from the fluid inlet section into the fluid flow chamber and an outlet control section configured for regulating fluid flow from the fluid flow chamber into the fluid outlet section.

16 Claims, 5 Drawing Sheets

(56) References Cited

U.S. PATENT DOCUMENTS

| | | | |
|---|---|---|---|
| 2015/0037181 A1* | 2/2015 | Hoppach | F04C 14/06 417/423.8 |
| 2015/0288249 A1* | 10/2015 | Hemphill | H02K 7/116 310/83 |
| 2016/0025092 A1* | 1/2016 | Miyagawa | F04C 15/0034 417/410.4 |
| 2017/0328362 A1 | 11/2017 | Hemphill et al. | |
| 2020/0277953 A1* | 9/2020 | Terada | F04C 2/10 |

* cited by examiner

INTEGRATED MOTOR AND PUMP INCLUDING RADIALLY MOVABLE OUTER GERATOR

The present disclosure relates generally to pumps and more specifically to pumps of automotive vehicle transmissions.

BACKGROUND

In an automatic transmission vehicle, electrically driven auxiliary pumps may be used. These pumps may be integrated into a transmission internally or externally depending on axial constraints and system requirements.

SUMMARY OF THE INVENTION

A pump is provided. The pump includes a fluid inlet section, a fluid outlet section, a rotor axially between the fluid inlet section and the fluid outlet section, a stator surrounding the rotor and a center section radially inside of the rotor on a center axis of the pump. The rotor and the center section define a fluid flow chamber radially therebetween. The rotor is rotatable inside of the stator about the center section by electromagnetic forces urging the rotor towards the stator. The pump also includes an inlet control section configured for regulating fluid flow from the fluid inlet section into the fluid flow chamber and an outlet control section configured for regulating fluid flow from the fluid flow chamber into the fluid outlet section.

According to embodiments of the pump, the rotor, the stator, the inlet control section and the outlet control section may be arranged and configured such that rotation of the rotor in the stator generates in the fluid flow chamber a suction portion and a pressure portion that rotate about the center axis as the rotor is rotated by the electromagnetic forces. The inlet control section may be configured such that fluid from the fluid inlet section is forced through the inlet control section to the suction portion as the suction portion rotates about the center axis. The outlet control section may be configured such that fluid from the fluid flow chamber is forced through the outlet control section from the pressure portion to the fluid outlet section as the pressure portion rotates about the center axis. The inlet control section may include a plurality of circumferentially spaced inlet ports. The outlet control section may include a plurality of circumferentially spaced outlet ports. The rotor and stator may be configured such that each of the suction portion and the pressure portion passes by each of the inlet ports and each of the outlet ports multiple times during a single rotation of the rotor about the center axis. The inlet ports may be configured such that as the suction portion passes each of the inlet ports, fluid from the fluid inlet section flows through the respective inlet port being passed by the suction portion into the fluid flow chamber. The outlet ports may be configured such that as the pressure portion passes each of the outlet ports, fluid from the fluid flow chamber flows through the respective outlet port being passed by the pressure portion to the fluid outlet section. The inlet control section and the outlet control section may be configured such that an amount of each inlet port covered by the rotor and an amount of each outlet port covered by the rotor constantly changes as the rotor is rotated about the center section by electromagnetic forces. The inlet control section may be configured such that when the rotor is rotated about the center section by electromagnetic forces fluid flows through each of the inlet ports in succession with fluid flowing through each inlet port as the amount of the inlet port covered by the rotor decreases. The outlet control section may be configured such that when the rotor is rotated about the center section by electromagnetic forces fluid flows through each of the outlet ports in succession with fluid flowing through each outlet port as the amount of the outlet port covered by the rotor increases. The inlet control section and the outlet control section may be rotationally fixed so as not to rotate as the rotor rotates. The rotor and the stator may be arranged and configured such that the rotor moves eccentrically within the stator. The center section may have a star shaped cross-section as viewed axially and the rotor includes an inner diameter surface that defines a borehole having a star shaped cross-section as viewed axially. The center section may include plurality of circumferentially spaced radially outwardly extending protrusions protruding away from center axis and an inner diameter surface of the rotor includes a plurality of circumferentially spaced radially outwardly extending grooves extending away from center axis. The fluid inlet section, the fluid outlet section, the rotor, the stator, the center section, the inlet control section and the outlet control section may be held axially together by a single fastener.

An automotive vehicle transmission comprising the pump is also provided.

A method of constructing a pump is also provided. The method includes providing a rotor radially inside of a stator and radially outside of a center section. The rotor is rotatable inside of the stator about the center section by electromagnetic forces urging the rotor towards the stator. The method also includes fixing an inlet control section with respect to the stator at a first axial side of the rotor and providing a fluid inlet section upstream of the inlet control section; and fixing an outlet control section with respect to the stator at a second axial side of the rotor and providing a fluid outlet section downstream of the outlet control section. The rotor and the center section define a fluid flow chamber radially therebetween. The inlet control section is configured for regulating fluid flow from the fluid inlet section into the fluid flow chamber during rotation of the rotor inside of the stator about the center section. The outlet control section is configured for regulating fluid flow from the fluid flow chamber into the fluid outlet section during rotation of the rotor inside of the stator about the center section.

According to embodiments of the method, the rotor, the stator, the inlet control section and the outlet control section may be arranged and configured such that rotation of the rotor in the stator generates in the fluid flow chamber a suction portion and a pressure portion that rotate about the center axis as the rotor is rotated by the electromagnetic forces. The inlet control section may be configured such that fluid from the fluid inlet section is forced through the inlet control section to the suction portion as the suction portion rotates about the center axis. The outlet control section may be configured such that fluid from the fluid flow chamber is forced through the outlet control section from the pressure portion to the fluid outlet section as the pressure portion rotates about the center axis. The inlet control section may include a plurality of circumferentially spaced inlet ports. The outlet control section may include a plurality of circumferentially spaced outlet ports. The rotor and stator maybe configured such that each of the suction portion and the pressure portion passes by each of the inlet ports and each of the outlet ports multiple times during a single rotation of the rotor about the center axis. The inlet ports may be configured such that as the suction portion passes each of the inlet ports fluid from the fluid inlet section flows through the respective inlet port being passed by the suction portion into the fluid flow chamber. The outlet ports may be configured such that as the pressure portion passes each of the outlet ports fluid from the fluid flow chamber flows through the respective outlet port being passed by the pressure portion to the fluid outlet section. The inlet control section and the outlet control section may be configured such that an amount of each inlet port covered by the rotor and an amount of each outlet port covered by the rotor constantly changes as the rotor is rotated about the center section by electromagnetic forces. The inlet control section may be configured such that when the rotor is rotated about the center section by electromagnetic forces fluid flows through each of the inlet ports in succession with fluid flowing through each inlet port as the amount of the inlet port covered by the rotor decreases. The outlet control section may be configured such that when the rotor is rotated about the center section by electromagnetic forces fluid flows through each of the outlet ports in succession with fluid flowing through each outlet port as the amount of the outlet port covered by the rotor increases. The center section may have a star shaped cross-section as viewed axially and the rotor may include an inner diameter surface that defines a borehole having a star shaped cross-section as viewed axially. The center section may include a plurality of circumferentially spaced radially outwardly extending protrusions protruding away from center axis and an inner diameter surface of the rotor includes a plurality of circumferentially spaced radially outwardly extending grooves extending away from center axis.

BRIEF DESCRIPTION OF THE DRAWINGS

The present disclosure is described below by reference to the following drawings, in which:

FIG. 1b schematically shows a perspective view of the pump shown in FIG. 1a;

FIG. 2 shows an axial cross-sectional view of the pump along A-A in FIG. 1a;

DETAILED DESCRIPTION

The disclosure provides a space-saving electrically driven auxiliary pump. In one preferred embodiment, a stator of the pump has six poles, each wound with copper wire coils. The coils are energized in sequence to create a rotating force vector on rotor shaped as an outer gerotor. The rotor is forced to rotate around a center section shaped as an inner gerotor. As this eccentric rotation happens, various lobes between the rotor and the center section increase and decrease in volume, causing suction or pressure in the working fluid of the pump (for example, Automatic Transmission Fluid). The flow of fluid is controlled by a suction side (inlet) housing and a pressure side (outlet) housing. Each housing provides a main connection to either the sump or the main line of the hydraulic system being pressurized. Each housing also contains ports configured to align with the motion of the rotor. As the rotor wobbles in a circumferential direction, e.g., a counter-clockwise direction, the lobes which are getting smaller (pressure) are in communication with the pressure side ports. Likewise, the lobes which are getting larger (suction) are in communication with suction side ports. Thus, a passive porting system is defined which guides the fluid with no moving parts. The entire assembly is held together with a rivet. Many variations of these parameters are possible, such as different number of loads and different types of fasteners.

The pump in accordance with some preferred embodiments has several advantages. First, it is an electric pump with only one moving part, improving robustness. Second, only one fastener is needed for assembly, simplifying production. Third, size is reduced because the motor and pump are the same unit, as opposed to state-of-the-art pumps, where they are separate and must be assembled together.

Figure 1A:
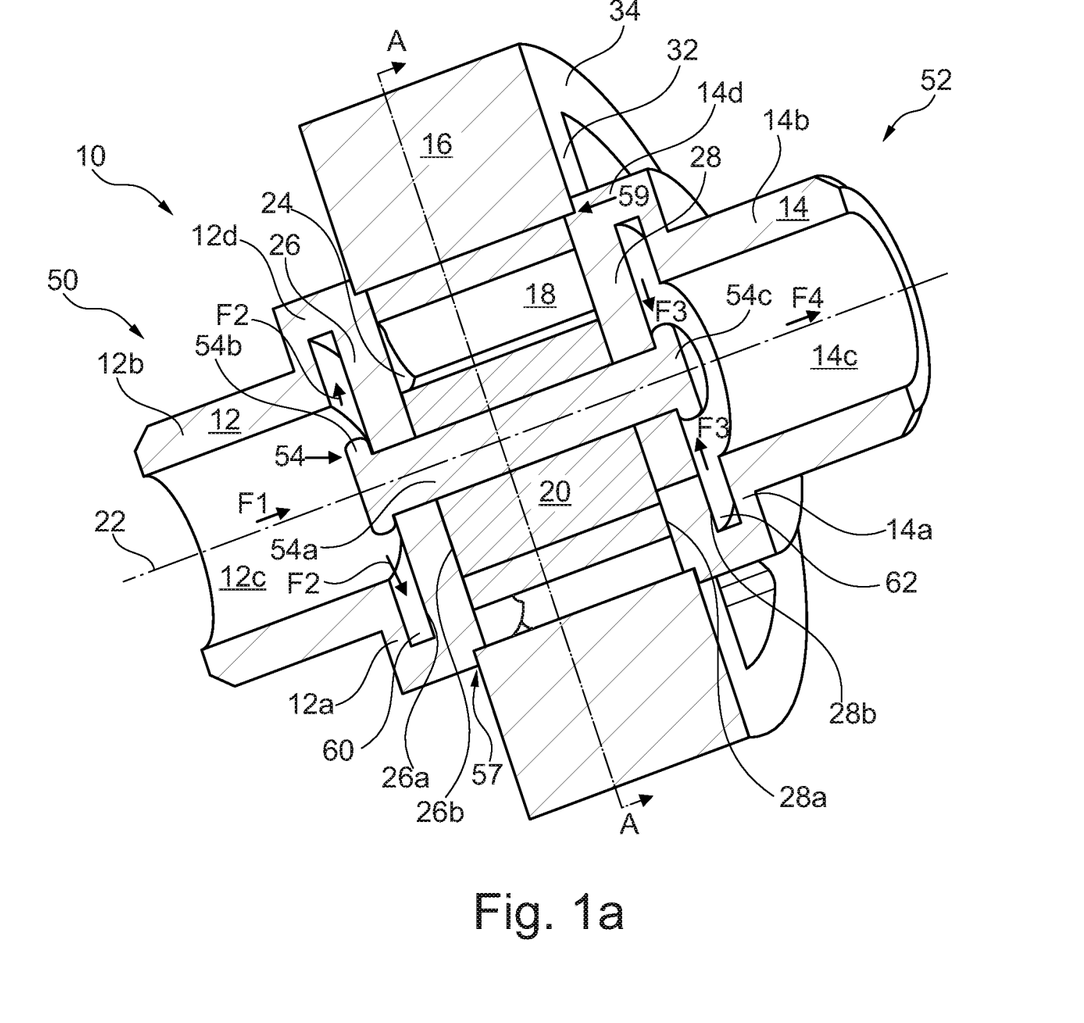
FIG. 1a schematically shows a radial cross-sectional side view of a pump for an automotive vehicle transmission according to an embodiment of the present disclosure.
Figure 1B:
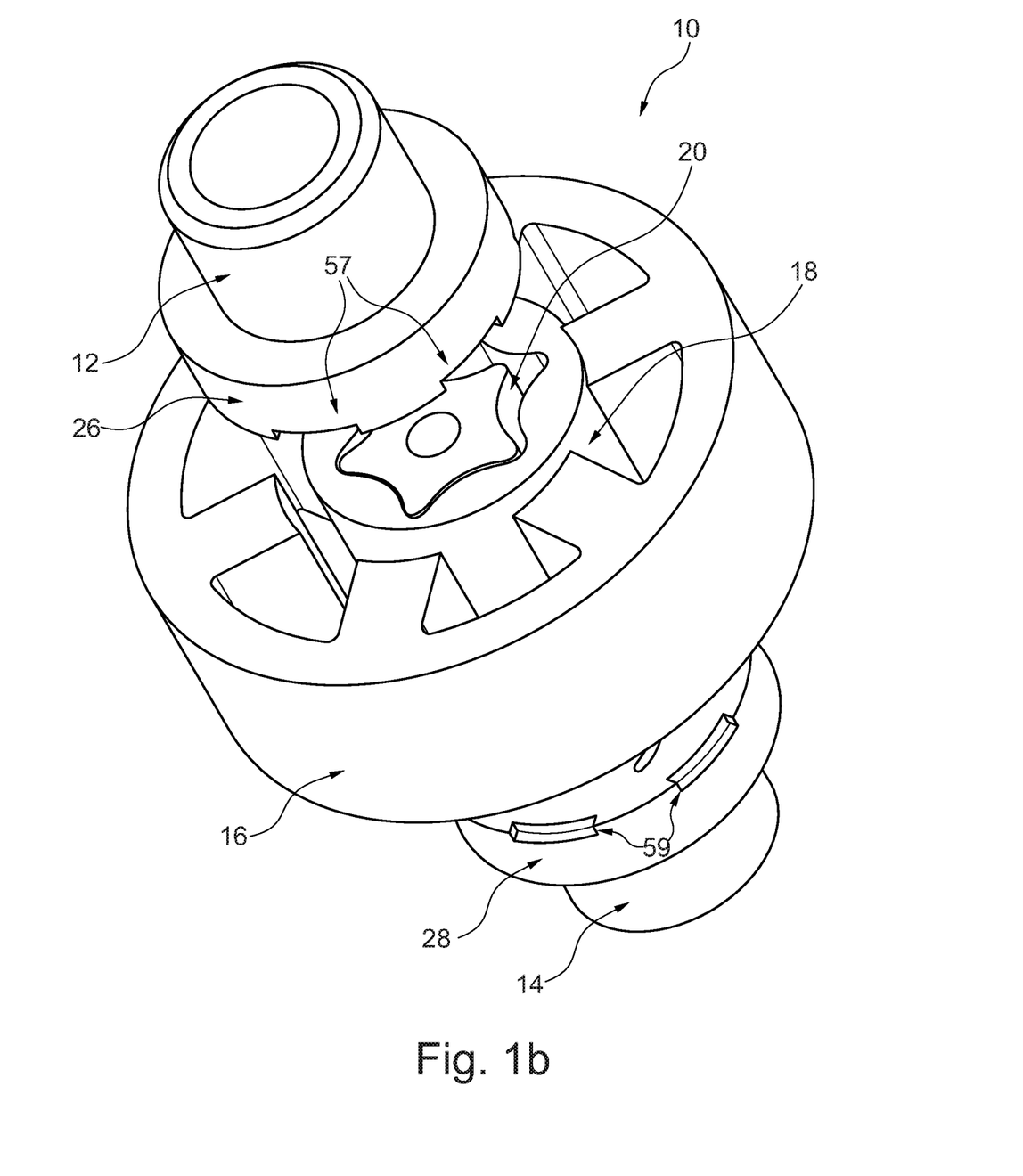
Figure 2:
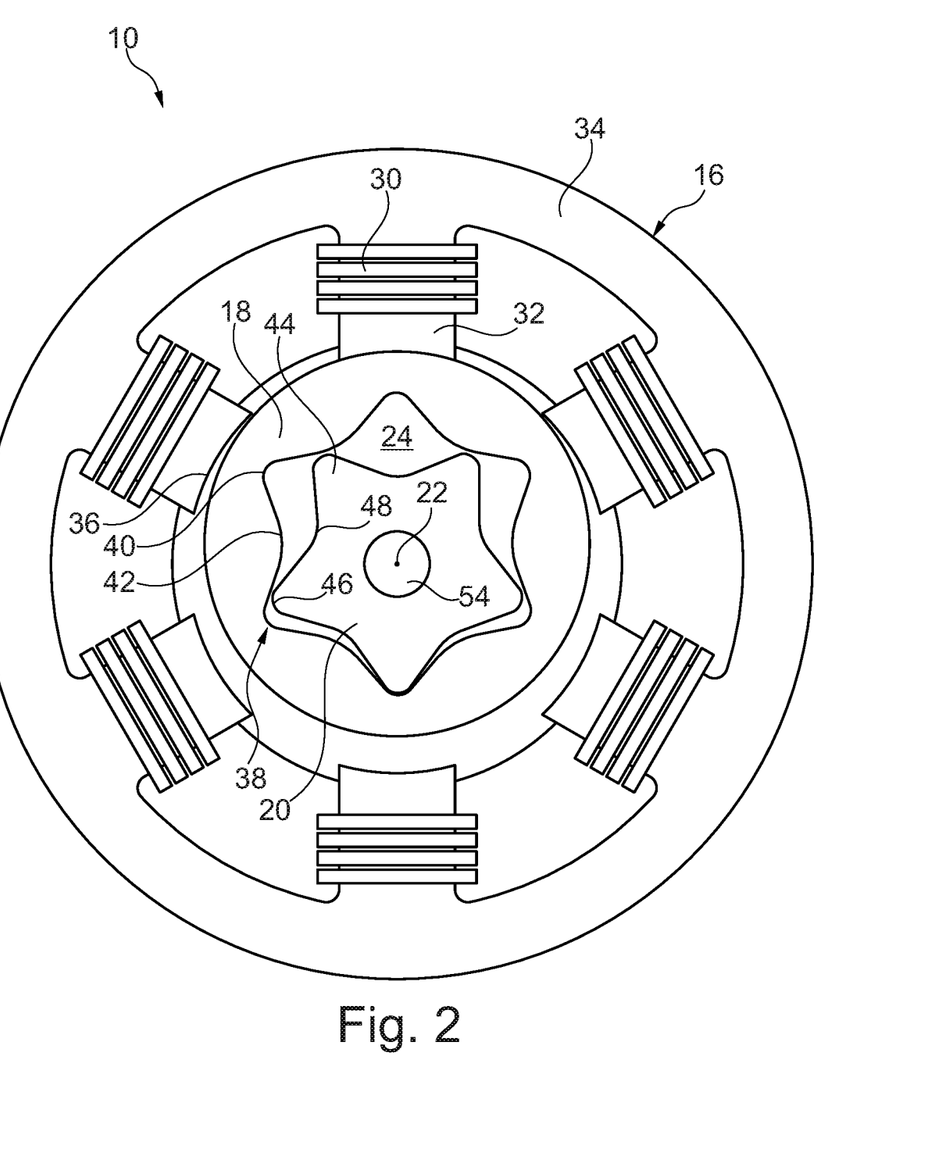

FIG. 1a schematically shows a cross-sectional radial view of a pump 10 for an automotive vehicle transmission according to an embodiment of the present disclosure FIG. 1b schematically shows a perspective view of the pump shown in FIG. 1a; and FIG. 2 schematically shows a cross-sectional axial view of pump 10 along A-A of FIG. 1a. Pump 10 may be used in other contexts besides an automotive vehicle transmission. Pump 10 includes a fluid inlet section 12 of the housing, a fluid outlet section 14 of the housing, a stator 16 axially between fluid inlet section 12 and fluid outlet section 14 and a rotor 18 axially between fluid inlet section 12 and the fluid outlet section 14. Rotor 18 is shaped as an outer gerotor and configured to rotate eccentrically within stator 16 about a center section 20, which is shaped as an inner gerotor. Center section 20 forms a stator of the pump, stator 16 forms a stator of the electric motor and rotor 18 is rotor of both the pump and the electric motor. Center section 20 is nonrotably fixed with respect to inlet and outlet section 12, 14, meaning that center section 20 is rotationally fixed so as not to rotate as rotor 18 rotates. A center of center section 20 defines a center axis 22 of pump 10 about which rotor 18 is designed to rotate. The terms radially, circumferentially and radially as used herein are used with respect to center axis 22, unless otherwise specified.

Rotor 18 and center section 20 define a fluid flow chamber 24 radially therebetween. Pump 10 also includes an inlet control section 26 configured for regulating fluid flow from fluid inlet section 12 into fluid flow chamber 24 and an outlet control section 28 configured for regulating fluid flow from fluid flow chamber 24 into fluid outlet section 14. Inlet control section 26 and outlet control section 28 are non-rotatably fixed in place with respect to center axis 22 and thus are rotationally fixed so as not to rotate as rotor 18 rotates.

As shown in FIG. 2, but omitted from FIGS. 1a, 1b, stator 16 is provided with a plurality of electrical windings 30 for generating electromagnetic forces in stator 16 to urge rotor 18 toward stator 16 such that rotor 18 rotates, i.e., wobbles, inside of stator 16 about axis 22. In this embodiment, stator 16 is provided with six electrical windings 30, but in other embodiments, stator 16 may be provided with any other amounts of windings 30 greater than three. Windings 30 are each wrapped around one of legs 32 of stator 16. Stator 16 includes a cylindrical ring 34 defining an outer circumference of stator 16, with each leg 32 protruding radially inward from cylindrical ring 34. Legs 32 each extend radially inward from an inner circumference of cylindrical ring 30. Radially inside of windings 26, legs 28 each include a radially innermost surface 36 on a free end thereof configured for contacting an outer circumferential surface of rotor 18. In the embodiment shown in FIGS. 1a, 1b and 2, surface 36 has a concave shape; however, in other embodiments surface 36 can be flat or have a different shape.

Rotor 18 in this embodiment has substantially cylindrical shape with a cylindrical outer diameter surface and an inner diameter surface that defines a borehole having a star shaped cross-section when view axially. The inner diameter surface of rotor 18 includes a plurality of circumferentially spaced radially outwardly extending grooves 38 extending away from center axis 22. Grooves 38 each have a concave shape and include a radially outermost nadir 40. Adjacent grooves 38 are spaced apart from each other by convex surfaces 42, which define portions of rotor 18 that are radially thicker than portions of rotor 18 at grooves 38.

Center section 20 in this embodiment has a star shaped cross-section when view axially and includes a plurality of circumferentially spaced radially outwardly extending protrusions 44 protruding away from center axis 22. Protrusions 44 each include a radially outermost rounded tip 46. Adjacent protrusions 44 are spaced apart from each other by concave surfaces 48, which define portions of center section 20 that are radially thicker than portions of center section 20 at protrusions 44.

In this embodiment, rotor 18 includes six grooves 38 and center section 20 includes five protrusions 44, but in other embodiments rotor 18 may include other amounts of grooves 38 and center section may include other amounts of protrusions 44, with the amount of protrusions 44 being one less than the number of grooves 38.

In the embodiment shown in FIGS. 1a, 1b and 2, fluid inlet section 12 and inlet control section 26 are formed integrally together as a one piece inlet housing part 50 and fluid outlet section 14 and outlet control section 28 are formed integrally together as a one piece outlet housing part 52. Fluid inlet section 12, fluid outlet section 14, stator 16, rotor 18, center section 20, inlet control section 26 and outlet control section 28 are held axially together by a single fastener 54. Center section 20 is sandwiched axially between inlet part 50 and outlet part 52 and is fixed to parts 50, 52 by fastener 54, which in this embodiment is a rivet, passing axially through inlet control section 26, center section 20 and outlet control section 28. Fastener 54 is centered on center axis 22 and includes a shaft 54a passing through sections 20, 26, 28 and two heads 54b, 54c contacting radially extending surfaces of control sections 26, 28, respectively. Fastener 54 also axially forces parts 50, 52 into stator 16 against radially inner ends of legs 32. Fluid flow chamber 24 is delimited axially between control sections 26, 28 and radially between the inner diameter surface of rotor 18 and the outer diameter surface of center section 20. Inlet control section 26 is provided with notches 57 for receiving inlet side edges of legs 32 and outlet control section 28 is provided with notches 59 for receiving outlet side edges of legs 32.

Rotor 18 is configured such that during rotation thereof, grooves 38 sequentially are forced onto protrusions 44 to continuously vary the configuration of fluid flow chamber 24. When an electric current is sent through any one of windings 30 a magnetic field is created which pulls rotor 18 toward that winding 30 in order to complete a magnetic circuit formed by the legs 32 of the stator. As rotor 18 moves toward the winding 30, rotor 18 displaces fluid, with which fluid flow chamber 24 between the rotor and stator is filled, creating pressure. The movement of rotor 18 within stator 16 about center section 20 separates fluid flow chamber 24 into a first portion, i.e., a pressure portion, that is pressurized to force fluid out of outlet section 14 and a second portion, i.e., a suction portion, that forms a vacuum to draw fluid into fluid flow chamber 24 from inlet section 12. The first portion of fluid flow chamber 24 accordingly has a lower pressure than the second portion of fluid flow chamber 24. As rotor 18 rotates within stator 16 about center section 20, the locations of the pressure portion and the suction portion of fluid flow chamber 24 rotate about center axis 2, with the pressure portion of fluid flow chamber 24 being oriented on the opposite radial side of center section 20 as the suction portion of fluid flow chamber 24 during the rotation.

Inlet control section 26 is configured such that fluid from fluid inlet section 12 is forced through inlet control section 26 to fluid flow chamber 24 by the movement of rotor 18 as the suction portion rotates about the center axis 22. Outlet control section 28 is configured such that fluid from fluid flow chamber 24 is forced through outlet control section 28 from the pressure portion to fluid outlet section 14 as the pressure portion rotates about center axis 22.

Figure 3:
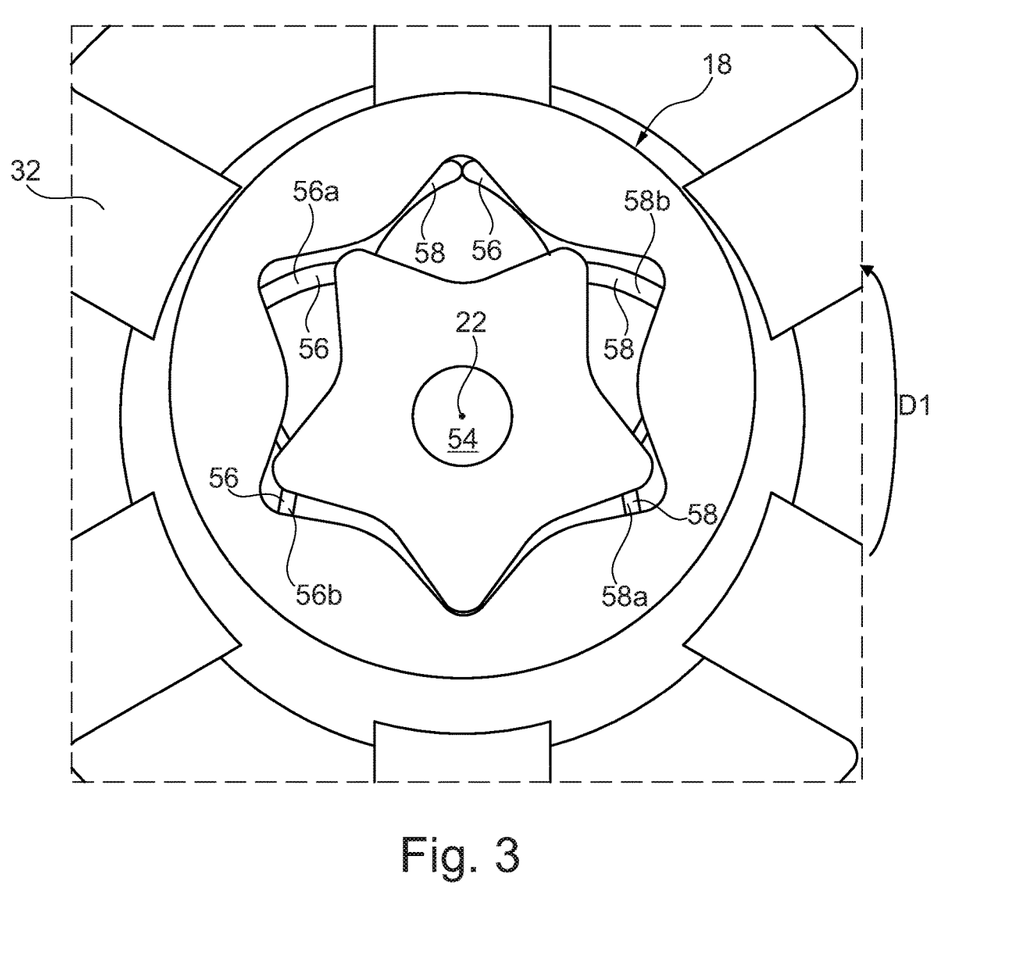
FIG. 3 shows an axial cross-sectional view of the pump to schematically illustrate suction or inlet ports formed in an inlet control section and pressure or outlet ports formed in an outlet control section.
Figure 4:
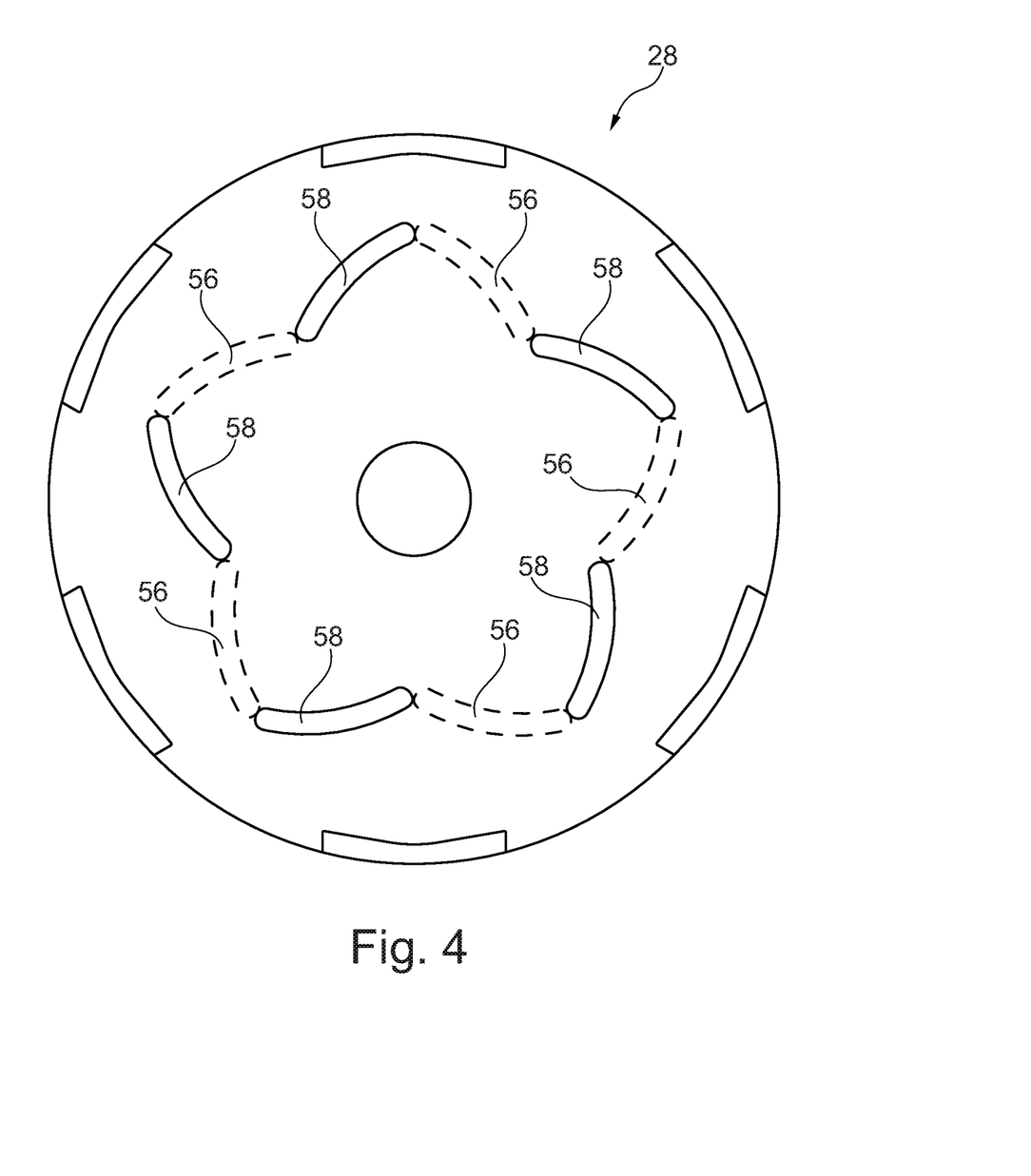
FIG. 4 shows an unobstructed view of an outlet control section showing outlet ports, and also showing where inlet ports are positioned with respect to outlet ports.

FIG. 3 schematically illustrates suction or inlet ports 56 formed in inlet control section 26 and pressure or outlet ports 58 formed in outlet control section 26. It should be understood that a cross-sectional axial view of pump 10 would not show both sets of ports 56, 58, and they are merely shown in FIG. 3 for illustrative purposes. FIG. 4 shows an unobstructed view of outlet control section 28 showing outlet ports 58, and also showing where inlet ports 56 are positioned with respect to outlet ports 58. In order to regulate the flow of fluid from inlet section 12 into fluid flow chamber 24, inlet control section 26 includes a plurality of inlet ports 56 formed therein passing from an inlet side radially extending surface 26a to a chamber side radially extending surface 26b of inlet control section 26. In order to regulate the flow of fluid from fluid flow chamber 24 to outlet section 14, outlet control section 28 includes a plurality of outlet ports 58 formed therein passing from a chamber side radially extending surface 28a to an outlet side radially extending surface 28b of inlet control section 28. Ports 56, 58 have a geometry configured with respect to a geometry of rotor 18 that causes rotor 18 to constantly vary in axial alignment and coverage of ports 56, 58 during rotation of the rotor 18 inside of stator 16 about the center section 20 to regulate a flow fluid entering into and out of fluid flow chamber 24 during rotation of the rotor 18 inside of stator 16 about the center section 20.

Inlet ports 56 extend both radially and circumferentially and are arc shaped and circumferentially spaced from each other, with one inlet port 56 being provided for each groove 38. Inlet ports 56 are arranged such that during the rotation of rotor 18 within stator 16 about center section 20, an amount of each port 56 covered by rotor 18 constantly changes. As the amount of a port 56 exposed to chamber 24 increases, fluid from inlet section 12 is sucked into fluid flow chamber 24. Accordingly, in FIG. 3, with rotor 18 rotating counter-clockwise in circumferential direction D1, fluid is flowing through a port 56a into fluid flow chamber 24. As shown in FIG. 1a, an axial fluid flow F1 flows into inlet section 12 and is forced radially outward at inlet side radially extending surface 26a of inlet control section 26 to provide a radial fluid flow F2 to a channel 60 formed between a flanged portion 12a of inlet section 12 and surface 26a. The radial fluid flow F2 then is sucked into chamber 24 through ports 56 at varying times in response to the motion of rotor 18 about center section 20.

As the suction portion is continuously rotating around axis 22, fluid flows through inlet ports 56 in succession when each inlet port 56 is aligned with the suction portion of chamber 24—i.e., as the amount of a port 56 covered by rotor 18 decreases. Referring to FIG. 3 and assuming that rotor 18 is rotating counter clockwise, the suction portion of chamber 24 is aligned with port 56a and fluid is being sucked into chamber 24 via port 56a. Next, based on the continued rotation of rotor 18, the suction portion of chamber 24 will be aligned with a port 56b and fluid will being sucked into chamber 24 via port 56b.

Outlet ports 58 also extend both radially and circumferentially and are arc shaped and circumferentially spaced from each other, with one inlet port 58 being provided for each groove 38. In the embodiment shown in FIGS. 3 and 4, outlet ports 58 are circumferentially offset from each other, such that when viewed axially, each outlet port 58 is circumferentially between two inlet ports 56. Outlet ports 58 are arranged such that during the rotation of rotor 18 within stator 16 about center section 20, an amount of each port 58 covered by rotor 18 constantly changes. As the amount of a port 58 exposed to chamber 24 decreases, fluid in chamber 24 is forced through the port 58 into outlet section 14. Accordingly, in FIG. 3, with rotor 18 rotating counter-clockwise in circumferential direction D1, fluid is flowing through a port 58a into outlet section 14. The fluid flowing through the outlet ports 58 then flows radially inward to generate a radial fluid flow F3 through a channel 62 formed between a flanged portion 14a of outlet section 14 and surface 28b of outlet control section 28. Radial fluid flow F3 then merges into an axial fluid flow F4 flowing out of outlet section 14.

As the pressure portion is continuously rotating around axis 22, fluid flows through outlet ports 58 in succession when each inlet port 58 is aligned with the pressure portion of chamber 24—i.e., as the amount of a port 58 covered by rotor 18 increases. Referring to FIG. 3 and assuming that rotor 18 is rotating counter clockwise, the pressure portion of chamber 24 is aligned with port 58a and fluid is being forced out of chamber 24 into via port 58a. Next, based on the continued rotation of rotor 18, the suction portion of chamber 24 will be aligned with a port 58b and fluid will being forced into chamber 24 via port 58b.

Accordingly, rotor 18 and stator 16 are configured such that each of the pressure portion and the suction portion passes by each of inlet ports 56 and each of outlet ports 58 multiple times during a single rotation of rotor 18 about center axis 22. More specifically, in the embodiment shown in FIGS. 1a to 4, fluid flows through each of inlet ports 56 and each of outlet ports 58 during each ⅕ rotation of rotor 18 about axis 22, such that fluid flows through each of ports 56, 58 an amount of time equal to the number of protrusions 44 during each rotation of rotor 18 about axis 22.

Each of inlet section 12 and outlet section 14 has a stepped cylindrical shape. Inlet section 12 includes a smaller cylindrical section 12b that defines an upstream chamber 12c for axial fluid flow F1 and a larger cylindrical section 12d downstream of section 12b that is radially outside of and circumferentially surrounds inlet control section 26. Smaller and larger cylindrical sections 12b, 12d are joined by flange section 12a, which is disc-shaped. Inlet control section 26 is formed as a circular plate having a hole in the center thereof for receiving fastener 54. Inlet control section 26 is fixed to larger cylindrical section 12d.

Outlet section 14 includes a smaller cylindrical section 14b that defines a downstream chamber 14c for axial fluid flow F4 and a larger cylindrical section 14d upstream of section 12b that is radially outside of and circumferentially surrounds outlet control section 28. Smaller and larger cylindrical sections 14b, 14d are joined by flange section 14a, which is disc-shaped. Outlet control section 28 is formed as a circular plate having a hole in the center thereof for receiving fastener 54. Outlet control section 28 is fixed to larger cylindrical section 14d.

Pump 10 also includes a controller configured to control the flow of the current through electrical windings 26 to rotate the rotor. In this embodiment, controller is in the form of transistors on control board for electrically commutating and controlling pump 10. Alternately, the controller can be remote and connected to windings 26 by wires.

In the embodiment shown in the figures, pump 10 is a gerotor pump; however, in other embodiments, a similar construction may be made with other pump types, including an internal gear pump or a vane pump.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 pump
12 fluid inlet section
12a flanged portion
12b smaller cylindrical section
12c upstream chamber
12d larger cylindrical section
14 fluid outlet section
14a flanged portion
14b smaller cylindrical section
14c downstream chamber
14d larger cylindrical section
14e axially extending fingers
16 stator
18 rotor
20 center section
22 center axis
24 fluid flow chamber
26 inlet control section
26a inlet side radially extending surface
26b chamber side radially extending surface
28 outlet control section
28a chamber side radially extending surface
28b outlet side radially extending surface
30 electrical windings
32 stator legs
34 cylindrical ring
36 radially innermost surface
38 grooves
40 radially outermost nadir
42 convex surface
44 radially outwardly extending protrusions
46 radially outermost rounded tip
48 concave surfaces
50 inlet part
52 outlet part
54 fastener
54a fastener shaft
54b, 54c fastener heads
56, 56a, 56b inlet ports
58, 58a, 58b outlet ports
60 channel
62 channel
F1 inlet axial fluid flow
F2 inlet radial fluid flow F3 outlet radial fluid flow
F4 outlet axial fluid flow

What is claimed is:

1. A pump comprising:
   a fluid inlet section;
   a fluid outlet section;
   a rotor axially between the fluid inlet section and the fluid outlet section;
   a stator surrounding the rotor;
   a center section radially inside of the rotor on a center axis of the pump, the rotor and the center section defining a fluid flow chamber radially therebetween, the rotor being rotatable inside of the stator about the center section by electromagnetic forces urging the rotor towards the stator;
   an inlet control section configured for regulating fluid flow from the fluid inlet section into the fluid flow chamber during rotation of the rotor inside of the stator about the center section; and
   an outlet control section configured for regulating fluid flow from the fluid flow chamber into the fluid outlet section during rotation of the rotor inside of the stator about the center section,
   wherein the inlet control section includes a plurality of circumferentially spaced inlet ports and the outlet control section includes a plurality of circumferentially spaced outlet ports, and
   wherein the inlet control section and the outlet control section are configured such that an amount of each inlet port covered by the rotor and an amount of each outlet port covered by the rotor constantly changes as the rotor is rotated about the center section by electromagnetic forces.

2. The pump as recited in claim 1 wherein the rotor, the stator, the inlet control section and the outlet control section are arranged and configured such that rotation of the rotor in the stator generates in the fluid flow chamber a suction portion and a pressure portion that rotate about the center axis as the rotor is rotated by the electromagnetic forces, the inlet control section being configured such that fluid from the fluid inlet section is forced through the inlet control section to the suction portion as the suction portion rotates about the center axis, the outlet control section being configured such that fluid from the fluid flow chamber is forced through the outlet control section from the pressure portion to the fluid outlet section as the pressure portion rotates about the center axis.

3. The pump as recited in claim 2 wherein the rotor and stator are configured such that each of the suction portion and the pressure portion passes by each of the inlet ports and each of the outlet ports multiple times during a single rotation of the rotor about the center axis.

4. The pump as recited in claim 3 wherein the inlet ports are configured such that as the suction portion passes each of the inlet ports, fluid from the fluid inlet section flows through a respective inlet port being passed by the suction portion into the fluid flow chamber.

5. The pump as recited in claim 3 wherein the outlet ports are configured such that as the pressure portion passes each of the outlet ports, fluid from the fluid flow chamber flows through a respective outlet port being passed by the pressure portion to the fluid outlet control section.

6. The pump as recited in claim 1 wherein the inlet control section is configured such that when the rotor is rotated about the center section by electromagnetic forces fluid flows through each of the inlet ports in succession with fluid flowing through each inlet port as the amount of the inlet port covered by the rotor decreases.

7. The pump as recited in claim 1 wherein the outlet control section is configured such that when the rotor is rotated about the center section by electromagnetic forces fluid flows through each of the outlet ports in succession with fluid flowing through each outlet port as the amount of the outlet port covered by the rotor increases.

8. The pump as recited in claim 1 wherein the inlet control section and the outlet control section are rotationally fixed so as not to rotate as the rotor rotates.

9. The pump as recited in claim 1 wherein the rotor and the stator are arranged and configured such that the rotor moves eccentrically within the stator.

10. The pump as recited in claim 1 wherein the center section has a star shaped cross-section as viewed axially and the rotor includes an inner diameter surface that defines a borehole having a star shaped cross-section as viewed axially.

11. The pump as recited in claim 10 wherein the center section includes a plurality of circumferentially spaced radially outwardly extending protrusions protruding away from center axis and an inner diameter surface of the rotor includes a plurality of circumferentially spaced radially outwardly extending grooves extending away from center axis.

12. The pump as recited in claim 1 wherein the fluid inlet section, the fluid outlet section, the rotor, the stator, the center section, the inlet control section and the outlet control section are held axially together by a single fastener.

13. An automotive vehicle transmission comprising the pump recited in claim 1.

14. The pump as recited in claim 1 wherein the inlet ports and the outlet ports are each arc shaped.

15. The pump as recited in claim 1 wherein the inlet ports and the outlet ports each extend both radially and circumferentially.

16. A pump comprising:
   a fluid inlet section;
   a fluid outlet section;
   a rotor axially between the fluid inlet section and the fluid outlet section;
   a stator surrounding the rotor;
   a center section radially inside of the rotor on a center axis of the pump, the rotor and the center section defining a fluid flow chamber radially therebetween, the rotor being rotatable inside of the stator about the center section by electromagnetic forces urging the rotor towards the stator;
   an inlet control section configured for regulating fluid flow from the fluid inlet section into the fluid flow chamber during rotation of the rotor inside of the stator about the center section; and
   an outlet control section configured for regulating fluid flow from the fluid flow chamber into the fluid outlet section during rotation of the rotor inside of the stator about the center section,
   wherein the fluid inlet section, the fluid outlet section, the rotor, the stator, the center section, the inlet control section and the outlet control section are held axially together by a single fastener.

* * * * *